United States Patent [19]
Nagaoka et al.

[11] Patent Number: 5,095,390
[45] Date of Patent: Mar. 10, 1992

[54] APPARATUS FOR STORING AND FEEDING ENDLESS TAPE AND RECORDED TAPE DUPLICATOR SYSTEM UTILIZING THE SAME

[75] Inventors: Kazuo Nagaoka, Kanegawa; Masayoshi Matsuyama, Tokyo; Yoshiki Takao; Masato Yamamoto, both of Kanagawa, all of Japan

[73] Assignee: Sony Magnescale Inc., Japan

[21] Appl. No.: 349,264

[22] Filed: May 9, 1989

[30] Foreign Application Priority Data

| May 10, 1988 | [JP] | Japan | 63-112755 |
| Sep. 22, 1988 | [JP] | Japan | 63-237880 |
| Sep. 29, 1988 | [JP] | Japan | 63-245513 |
| Sep. 29, 1988 | [JP] | Japan | 63-245514 |

[51] Int. Cl.$^5$ .................... G11B 5/86; G11B 5/008
[52] U.S. Cl. .................... 360/16; 360/90
[58] Field of Search ............ 242/182, 185; 360/90, 360/16

[56] References Cited

U.S. PATENT DOCUMENTS

| 2,542,506 | 2/1951 | Gibson | 179/100.2 |
| 2,889,491 | 6/1959 | MacDonald | 317/2 |
| 2,908,767 | 10/1959 | Fritzinger | 179/100.2 |
| 3,201,525 | 8/1965 | Boyden | 179/100.2 |
| 3,353,732 | 11/1967 | Reader | 242/182 |
| 4,000,516 | 12/1976 | Watanabe et al. | 360/71 |
| 4,236,391 | 12/1980 | Stobi | 68/5 D |
| 4,373,362 | 2/1983 | Fleissner | 68/9 |
| 4,387,843 | 6/1983 | Rehklau | 226/118 |
| 4,589,580 | 5/1986 | Young, Jr. et al. | 226/119 |
| 4,751,602 | 6/1988 | Beaujean | 360/90 |
| 4,868,688 | 9/1989 | Nagaoka et al. | 360/16 |

FOREIGN PATENT DOCUMENTS

| 3736915 | 5/1988 | Fed. Rep. of Germany . |
| 6257154 | 3/1987 | Japan . |
| 219881 | 6/1988 | Japan . |
| 813792 | 5/1959 | United Kingdom . |
| 885770 | 12/1961 | United Kingdom . |
| 916740 | 1/1963 | United Kingdom . |
| 1026450 | 4/1966 | United Kingdom . |

OTHER PUBLICATIONS

Patent Abstracts of Japan P-605 Aug. 15, 1987, vol. 11/No. 252.

Primary Examiner—John H. Wolff
Assistant Examiner—Won Tae C. Kim
Attorney, Agent, or Firm—Ronald P. Kananen

[57] ABSTRACT

An endless tape storage apparatus has a casing defining a chamber for storing the endless tape. The casing defines an inlet through which the tape is introduced and an outlet through which the tape is withdrawn. A movable section is associated with the inlet, storing the tape in folded form and transferring the tape toward the outlet. A stationary section is provided downstream of the movable section for decelerating the transfer speed of the tape and for adjusting accumulation of the transferred tape and feeding the tape toward the outlet in unfolded form.

22 Claims, 17 Drawing Sheets

FIG. 21
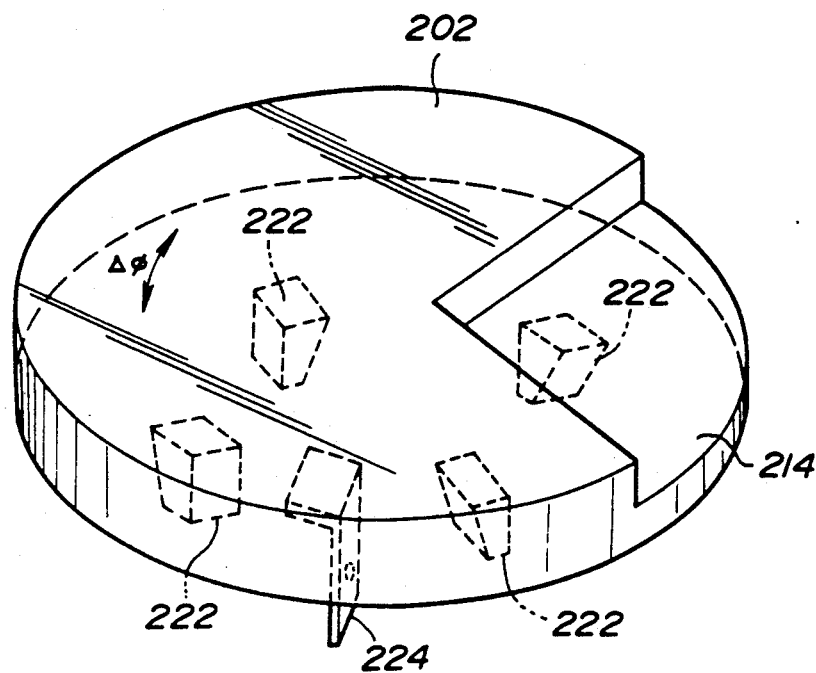
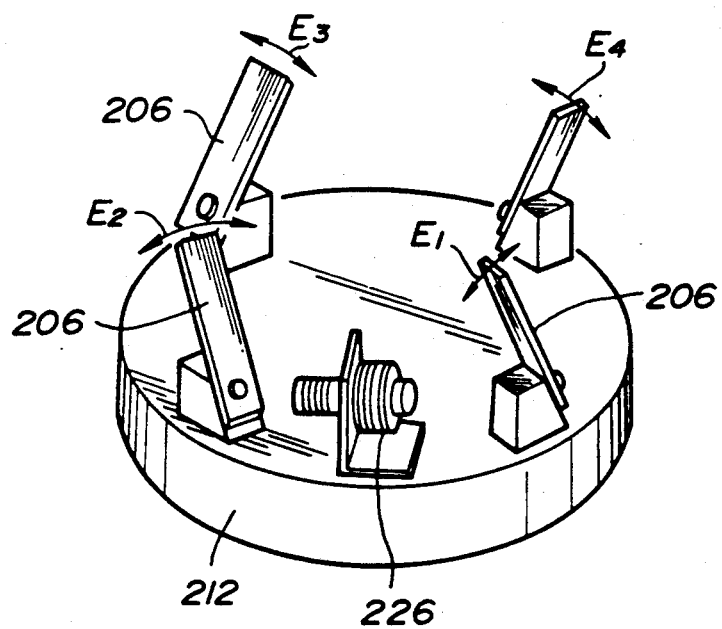

APPARATUS FOR STORING AND FEEDING ENDLESS TAPE AND RECORDED TAPE DUPLICATOR SYSTEM UTILIZING THE SAME

BACKGROUND OF THE INVENTION

1. Field of the Invention

The present invention relates generally to an apparatus for storing and feeding an endless tape for storing the endless tape and feeding the stored tape at high speed. The invention also relates to a tape duplicator system for transferring recording information on a master tape to an endless tape form slave tape.

2. Description of the Background Art

In a high speed recorded tape duplicating and recording system as well as in data processing equipment utilizing such an endless tape, it is now common practice to utilize an endless tape storage apparatus in which a long length of tape is folded back and forth in a serpentine fashion in a generally rectangular shaped storage apparatus having front and back walls which are separated only slightly more than the width of the tape to be stored. In such apparatus, the tape is normally loaded from the top and caused to loop back and forth upon itself as the other end is withdrawn from the bottom of the loop pile. The tapes own weight is used to compact the serpentine loops within the storage apparatus. Such storage apparatus have been disclosed in U.S. Pat. Nos. 2,542,506 to Gibson, 2,889,491 to Donald, 2,908,767 to Fritzinger and 3,201,525 to Boyden. Another proposal have been made in U.S. Pat. No. 4,000,516 to Kazuo Watanabe et al, in which a plurality of short belt conveyors are used for transferring the endless tape within the storage apparatus.

In order to solve the problems associated with the prior art set forth above, U.S. Pat. No. 4,387,843, issued to George D. Rehklau on Jun. 14, 1983, proposes an endless tape storing apparatus which includes a front wall and a rear wall separated by slightly more than the width of the tape to be stored, a pair of entry and exit openings at the top, a resilient distributing arm located proximate the entry opening a compliant length of flexible material suspended from each side of the apparatus and forming a catenary configured to conform to the bottom of the apparatus, and a compliant damper loop disposed midway down the apparatus and adjacent the exit side thereof for damping exiting tape tension fluctuations and assisting in the stacking of tape within the apparatus.

Though the Rehklau's apparatus improves the prior art apparatus, it is still not satisfactory for permitting satisfactorily high speed for desirable in a system for providing higher speed recorded tape is disclosed in co-pending U.S. patent application Ser. No. 113,737, filed on Oct. 28, 1987 which has also been disclosed in British Patent First publication 2,198,281, which are commonly assigned to the owner of the present invention. The apparatus includes a casing which defines a strip storage space. The casing has at least one peripheral wall which is capable of oscillation. Oscillation of this wall causes an oscillation component in the tape feeding direction. The storage apparatus includes means for exerting an externally generated feeding force on the endless tape, which force includes a component in the direction of the tape feed direction for transferring the endless tape. This wall is cooperative with the force exerting means to smoothly feed the tape from the inlet of the casing to the outlet of the casing.

The prior proposed apparatus is successful is establishing successful tape transfer in the storage apparatus and thus permitting high speed tape feed. However, in such prior proposed apparatus, a drawback is encountered in that the tape in the storage means is stacked in the vicinity of the outlet of the casing. This tends to damage the tape and lowers the tape feeding ability. In order to avoid this problem, it becomes necessary to control tape transfer speed within the storage apparatus in synchronism with the tape feed speed in the recorded tape duplicating system. Therefore, it becomes necessary for adjusting the endless tape transferring speed depending upon the length of the tape to be stored in the apparatus and the tape feed speed in the duplicating system. Since the length of the endless master tape is variable depending upon the amount of information to be stored, adjustment of the tape transfer speed has to be done every time the endless tape length is varied.

In addition, in recent years, there have been developed recording tapes of varying quality. In many cases, high quality tapes, such as metal tapes, are sensitive to holding stress and are easily damaged by relatively low holding stress. Therefore, in order to prevent the tape from being damaged, it becomes necessary to adjust the tape feed speed of the storage apparatus in view of the kind of tape.

SUMMARY OF THE INVENTION

Therefore, it is an object of the present invention to provide an endless tape storage apparatus which does not require adjustment of the tape feeding speed.

Another object of the invention is to provide a recorded tape duplicating system which employs the endless tape storage system according to the invention.

According to one aspect of the invention, an endless tape storage apparatus comprises:

a casing defining a chamber for storing the endless tape, the casing defining an inlet through which the tape is introduced and an outlet through which the tape is withdrawn;

a movable section associated with the inlet, storing the tape in folded form and transferring the tape mounted thereon toward the outlet;

a stationary section provided downstream of the movable section and decelerating transferring speed of the tape and accumulating the transferred tape.

The chamber may be defined on a horizontal plane for storing and transferring the tape on the horizontal plane. The movable section comprises a movable plate and an external driving unit for driving the movable plate for exerting transferring force to the tape mounted thereon. The driving unit comprises a spring member resiliently supporting the movable plate, a yoke and electromagnet combination, the electromagnet being periodically energized and deenergized for generating vibration energy including a component in the tape transferring direction.

In the preferred embodiment, the first stationary section is provided with means for varying the transferring direction.

The driving unit comprises a spring member resiliently supporting the movable plate and piezoelectric elements periodically energized and deenergized for generating vibration energy including a component in the tape transferring direction. The chamber is separated into a first tape transfer section associated with the inlet and a second tape transfer section associated with the outlet, a first movable section and a first stationary section being provided in the first tape transfer section, and a second movable section and second stationary section being provided in the second tape transfer section, the first and second movable sections transferring the tape thereon in different directions to each other.

The chamber is separated into a first tape transfer section associated with the inlet and a second tape transfer section associated with the outlet, a first movable section being provided in the first tape transfer section, and a second movable section and second stationary section being provided in the second tape transfer section, and a third movable section provided for transferring the tape transferred through the first tape transfer section to the second tape transfer section, the first, second and third movable sections transferring the tape thereon in different directions to each other. The first tape transfer section transfers a tape in a direction substantially parallel to a tape feed direction at the inlet and the second tape transfer section transfers the tape in a direction opposite to the tape transfer direction in the first tape transfer section.

The endless tape storage apparatus may further comprise a stationary plate oriented at a position inside of the turning section where the tape transferring direction is changed between the first and second tape transfer sections.

According to another aspect of the invention, an endless tape storage apparatus comprises:
 a casing defining an essentially circular chamber, an inlet through which the tape is introduced into the circular chamber, and an outlet through which the tape within the circular chamber is withdrawn;
 a movable plate forming a bottom of the chamber;
 a driving unit associated with the movable plate for exerting energy in circumferential direction for feeding tape in the circumferential direction from the inlet to the outlet.

The endless tape storage apparatus may further comprise a stationary plate provided in the vicinity of the outlet for decelerating the tape transferring speed and accumulating the tape thereon.

The drive unit generates vibration energy for causing the movable plate to vibrate, the vibration of the movable plate including a component directed in the circumferential direction. The drive unit drives the movable plate to rotate at a rotation speed corresponding to a desired tape transferring speed. The driving unit comprises a spring member resiliently supporting the movable plate, a yoke and electromagnet combination, the electromagnet being periodically energized and deenergized for generating vibration energy including a component in the tape transferring direction.

The driving unit comprises a spring member resiliently supporting the movable plate and piezoelectric elements periodically energized and deenergized for generating vibration energy including a component in the tape transferring direction.

According to a further aspect of the invention, a tape duplicator system for duplicating information recorded on an endless form master tape to a continuously fed blank slave tape, comprises:
 first means for defining a first path through which the master tape is circulated;
 second means for defining a second path through which the slave tape is fed, the second path including an information transfer section at which the slave tape mates with the master tape;
 third means, active at the information transferring section, for duplicating information recorded on the master tape to the slave tape; and
 an endless tape storage apparatus comprising:
  a casing defining a chamber for storing the endless master tape, the casing defining an inlet through which the master tape is introduced and an outlet through which the master tape is withdrawn;
  a movable section associated with the inlet, storing the master tape in folded form and transferring the master tape mounted thereon toward the outlet;
  a stationary section provided downstream of the movable section for decelerating transferring speed of the master tape and accumulating the transferred master tape.

According to a yet another aspect of the invention, a tape duplicator system for duplicating information recorded on an endless form master tape to a continuously fed blank slave tape, comprises:
 first means for defining a first path through which the master tape is circulated;
 second means for defining a second path through which the slave tape is fed, the second path including an information transfer section at which the slave tape mates with the master tape;
 third means, active at the information transferring section, for duplicating information recording on the master tape to the slave tape; and
 an endless tape storage apparatus comprising:
  a casing defining an essentially circular chamber, an inlet through which the master tape is introduced into the circular chamber, and an outlet through which the master tape within the circular chamber is withdrawn;
  a movable plate forming a bottom of the chamber;
  a driving unit associated with the movable plate for exerting energy in the circumferential direction for feeding master tape in circumferential direction from the inlet to the outlet.

BRIEF DESCRIPTION OF THE DRAWINGS

The present invention will be understood more fully from the detailed description given herebelow and from the accompanying drawings of the preferred embodiments of the invention, which, however, should not be taken to limit the invention to the specific embodiments but are for explanation and understanding only.

In the drawings:

FIG. 21 is an exploded perspective illustration of a modification of the fourth embodiment of the endless tape storage apparatus;

DESCRIPTION OF THE PREFERRED EMBODIMENTS

Figure 1:
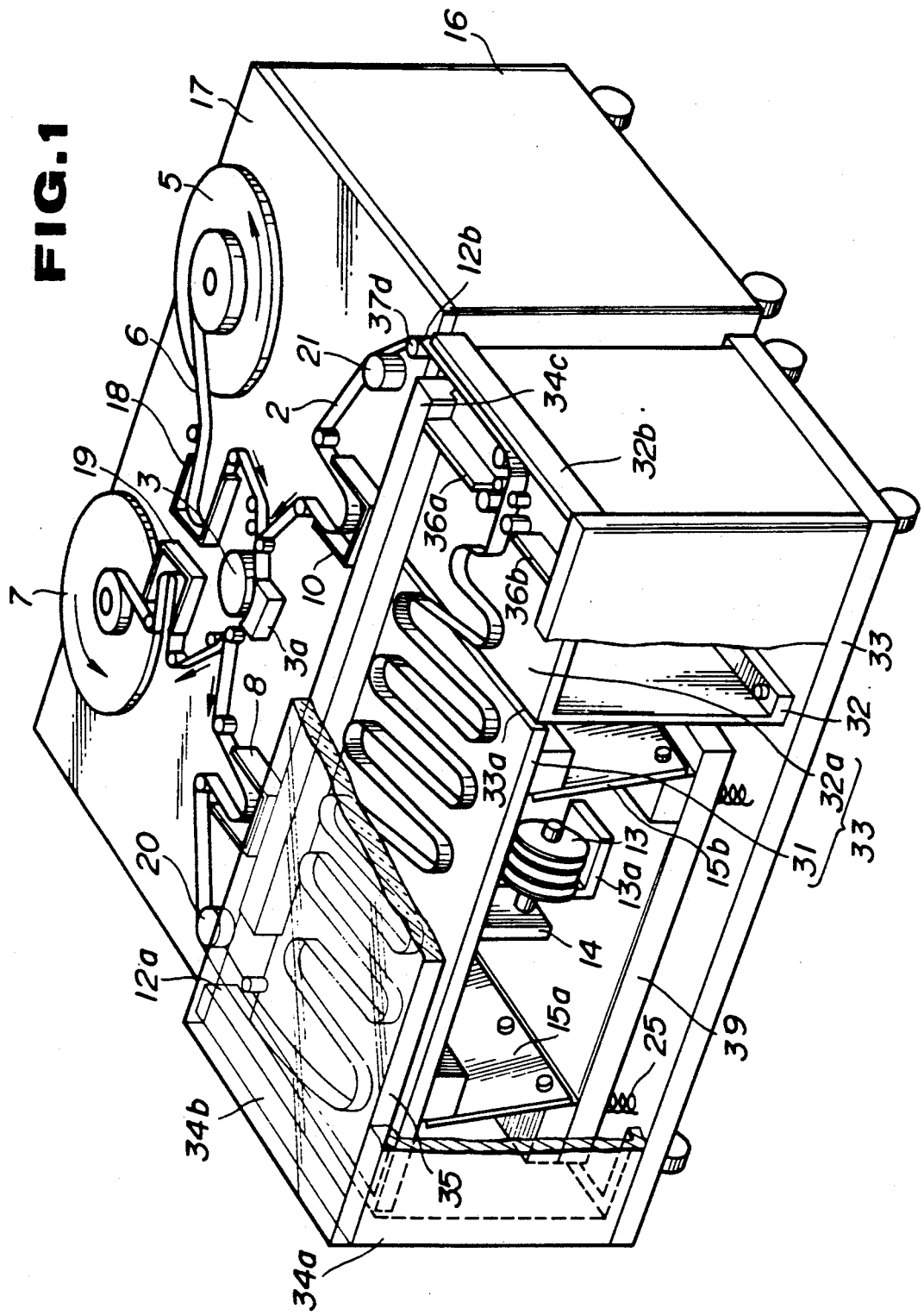
FIG. 1 is a perspective view of the first embodiment of an endless tape storage apparatus according to the present invention, which is illustrated in a form employed in a recorded tape duplicating system according to the invention.
Figure 2:
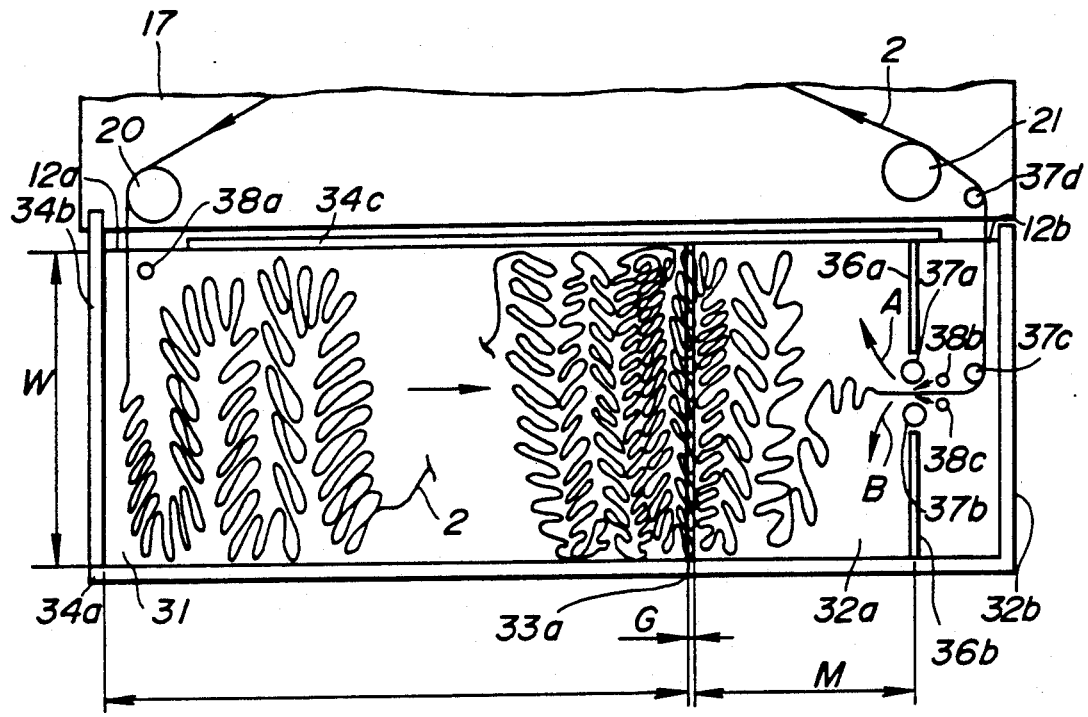
FIG. 2 is a plane view of the first embodiment of the endless tape storage apparatus of FIG. 1.
Figure 3:
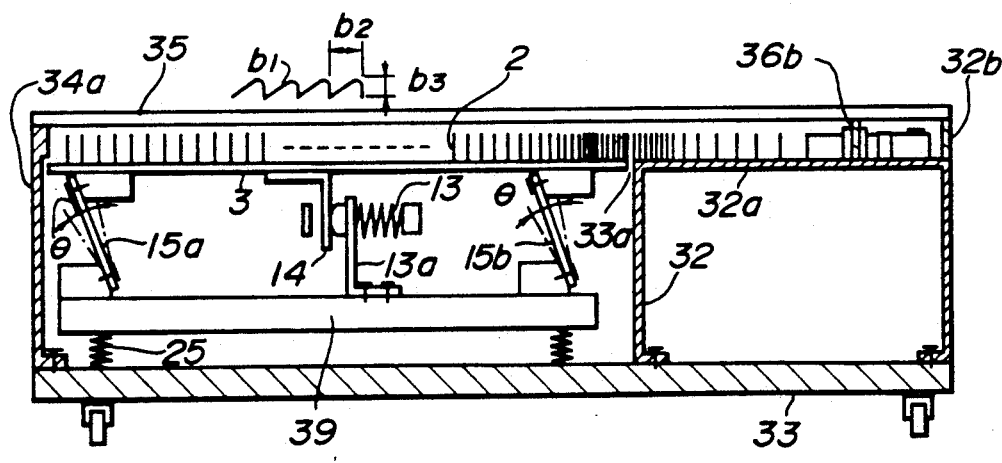
FIG. 3 is a section of the first embodiment of the endless tape storage apparatus according to the present invention, in which is shown a drive mechanism for producing a tape, feed force for the apparatus.

Referring now to the drawings, particularly to FIGS. 1 to 3, the first embodiment of an endless tape storage apparatus, according to the present invention, is coupled with a recorded tape duplicator system for transferring information recorded on an endless loop form master tape 2 to a slave tape 6. In the shown embodiment, the recorded tape duplicating system is adapted for duplicating recorded information on a video tape. The master tape has information in reversed form so that the normal form information can be transferred to the slave tape.

The recorded tape duplicating system has a horizontal mechanical panel 17 mounted on a base 16. A supply reel 7 and a take-up reel 5 are arranged on the mechanical panel for supplying and taking up the slave tape 6. The slave tape 6 runs from the supply reel 7 to the take-up reel 5 via a transfer head 3a. Air tensioning devices 18 and 19 are provided in the slave tape path for adjusting tension on the slave tape 6.

The master tape 2 is stored in the preferred embodiment of the endless tape storage apparatus which is generally represented by the reference numeral 33. The endless tape storage apparatus 33 defines a horizontal tape receptacle chamber 34 for receiving the endless master tape 2. The tape receptacle chamber 34 has an inlet 12a and an output 12b respectively associated with a master tape path defined on the mechanical panel 17 of the recorded tape duplicating system. The master tape path extends from the outlet 12b of the tape receptacle chamber 34 and the inlet 12a over the transfer head 3a. Capstans 20 and 21, a guide roller 37d and air tensioning device 8 and 10 are provided in the vicinity of the master tape path. The master tape 2 mates with the slave tape 6 at the information transfer section where the transfer head 3a is provided. The information transferring operation is performed at the information transfer section in a per se known manner by means of the information transfer head 3a and a rotary drum 3.

The endless tape storage apparatus 33 arranges the tape receptacle chamber 34 on substantially the same horizontal plane of the mechanical panel 17 of the recorded tape duplicating system. The apparatus 33 has a vibration plate 31 and a stationary plate 32a. The vibration plate 31 and the stationary plate 32a cooperate with each other for forming a bottom of the tape receptacle chamber 34. As seen from FIGS. 1 and 2, the vibration plate 31 is arranged at an inlet side and the stationary plate 32a is arranged at an outlet side. The stationary plate 32a is formed integrally with vertically extending plates 32 which are rigidly fixed onto a base 33b of the elongated tape storage apparatus. On the other hand, the vibration plate 31 is supported by means of leaf springs 15a and 15b which are secured to the lower surface of the vibration plate 31. The lower end of the leaf springs 15a and 15b are rigidly secured on a floating base 39. The floating base 39 is resiliently supported on the base 33b by means of springs 25.

As clearly shown in FIG. 3, the leaf springs 15a and 15b are provided obliquely with respect to the horizontal place inclined from the inlet side to the outlet side as shown.

An electromagnet 13 is mounted on the floating base 39 by means of a mounting bracket 13a. Opposing the electromagnet 13, a yoke 14 is provided. The yoke 14 is rigidly mounted on the lower surface of the vibration plate 31. The electromagnet 13 cooperates with the yoke 14 for oscillatingly driving the vibration plate 31. The electromagnet 13 is designed to draw the yoke to cause resilient angular displacement of the leaf springs 15a and 15b to an angle $\theta$ with respect to its initial position when it is energized. When the electromagnet 13 is deenergized, the leaf springs 15a and 15b resiliently return to the initial position. For the electromagnet 13, a predetermined frequency and a predetermined amplitude of drive signal is applied for vibratingly driving the vibration plate 31. In practice, the drive signal may have a frequency of 50 Hz and a given amplitude selected for causing $\theta$ of angular displacement of the leaf springs 15a and 15b. By this, the vibration plate 31 is driven by an vibration energy having vertical component $b_3$ and horizontal component $b_2$. Therefore, the tape is transferred in a motion as shown by line $b_1$ of FIG. 3. At this time, the horizontal transfer distance $b_2$ of the tape essentially correspond to the magnitude of the leaf springs 15a and 15b as driven by the electromagnet 13.

The vibration plate 31 is oriented at an elevation slightly higher than the elevation of the stationary plate 32a. The vibration plate 31 and the stationary plate 32a are arranged in spaced apart relationship with a gap G therebetween, as shown in FIG. 2.

The tape receptable chamber 34 is defined by the vibration plate 31, the stationary plate 32a serving as the bottom of the chamber, side walls 34a, 34b, 34c, 36a and 36b, and a cover plate 35. The cover plate 35 is formed of a transparent material, such as transparent resin, glass or so forth. The side walls 34a, 34b and 34c are rigidly secured on the base 33b. On the other hand, the side walls 36a and 36b are rigidly secured to the stationary plate 32a. The side walls 36a and 36b are spaced apart to permit the tape to pass therethrough to the outlet 12b. In the vicinity of the clearance defined between the side walls 36a and 36b, tape guide rollers 37a and 37b and air nozzles 38a and 38b are provided. The air nozzles 38b and 38c are designed for blowing pressurized air in a direction opposite to the tape withdrawing direction so that the folded tape can be resolved to be smoothly fed out. Furthermore the air nozzles 38b and 38c serve to position the tape path in the clearance between the side walls 36a and 36b at the center thereof so that the tape may not be damaged by contacting with the side wall.

In the vicinity of the inlet 12a, an air nozzle 38a is provided. The air nozzle 38a is adapted to discharge pressurized air in the tape feeding direction so as to prevent the tape from jaming around the inlet 12a.

In the shown embodiment, the length L of a tape transferring section where the vibration plate 31 is provided and the length M of a stationary section where the stationary plate 32a is provided may be determined to satisfy the following relationship:

$$L:M = 2:1$$

In the experiments, with the above-mentioned dimensional relationship between the vibration plate 31 and the stationary plate 32a, large amount of the tape was stored without causing collision of the tape to the side walls 36a and 36b. Though the dimensional relationship set forth above may provide better storage performance, it is not essential to maintain the aforementioned optimal relationship. Even when the proportion between the vibration plate 31 and the stationary plate is far from that optimal relationship, the described embodiment of the endless tape storage apparatus according to the present invention, still has a sufficiently high capacity for tape storage and potential to smoothly transfer the tape therethrough.

In the practical embodiment, the length L of the vibration plate 31 is set approximately 1000 mm and the length M is set approximately 500 mm. In such case, the width of the vibration plate 31 and the stationary plate 32a may be set at approximately 500 mm. The clearance G between the vibration plate 31 and the stationary plate 32 is set at approximately 1 mm. When the length of the endless master tape stored in such storage apparatus is 250 m, the horizontal component $b_2$ of the vibration is set at approximately 1 mm to 2 mm and the vibration frequency is set at approximately 100 Hz.

As will be appreciated, the vibration frequency f of the vibration plate 31 may be selected to match with or be in the vicinity of the resonance frequency of the mass of the vibration plate 31, the leaf springs 15a and 15b and the base 39 so as to optimize driving performance of the electromagnet 13. In such case, the transfer speed of the tape is controlled mainly by adjusting the magnitude of vibration of the vibration plate.

Figure 4:
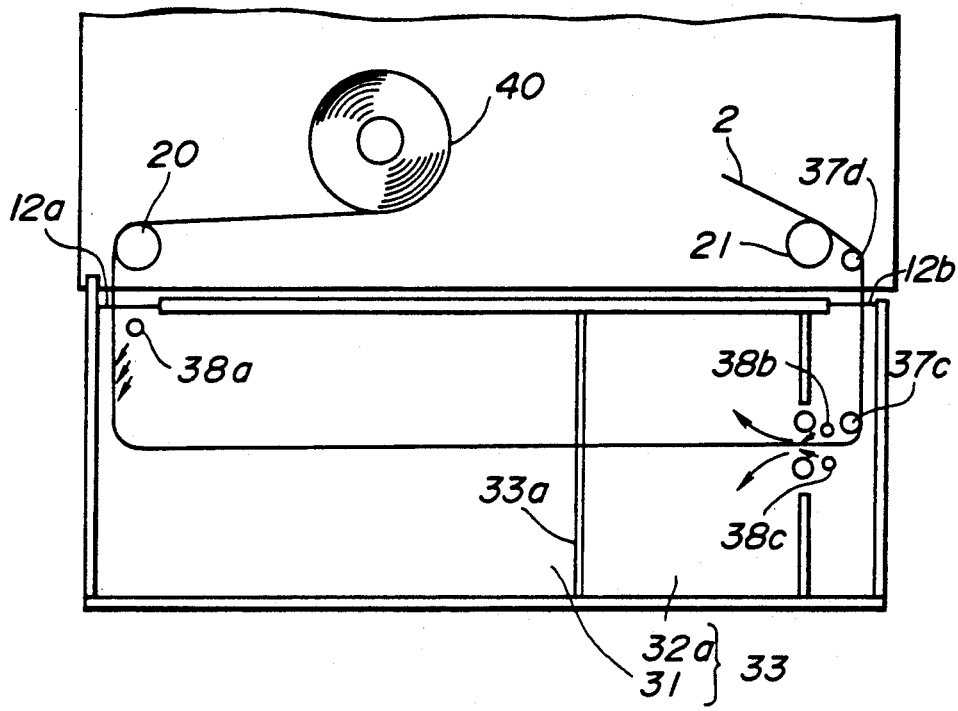
FIGS. 4 through 6 are illustrations showing process of initially setting the endless tape in the first embodiment of the endless tape storage apparatus of FIG. 1.
Figure 5:
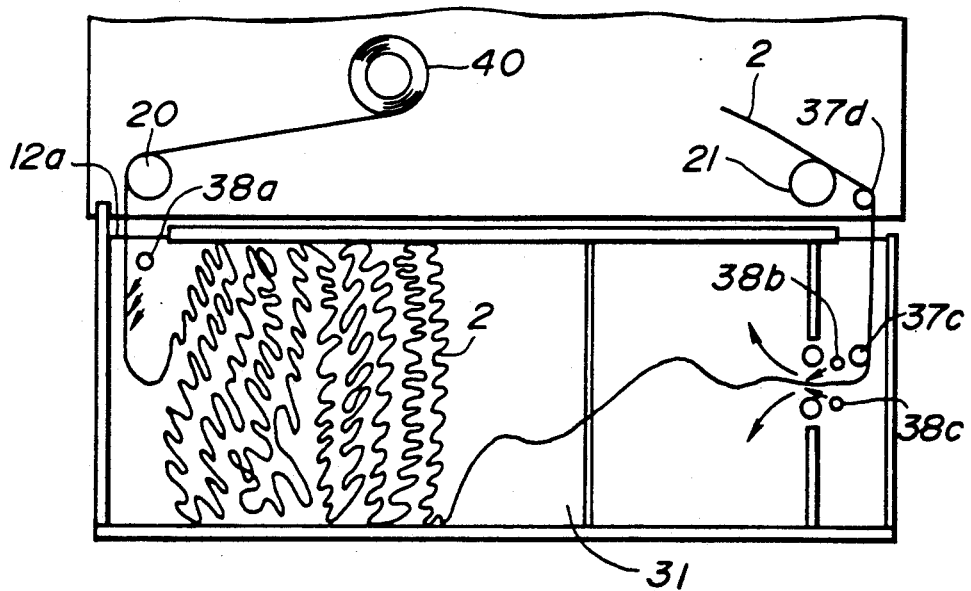
Figure 6:
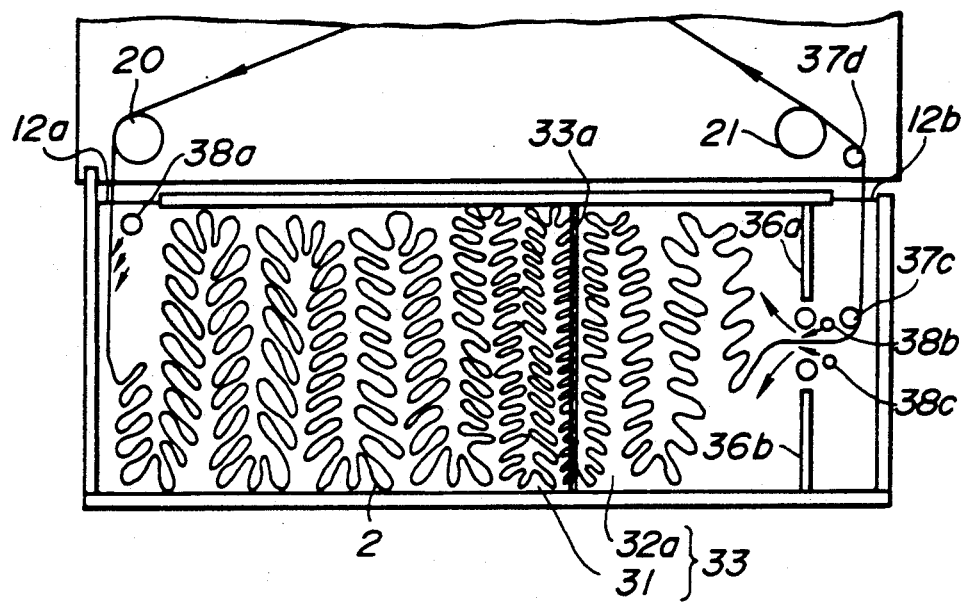

In order to initially setting the preferred embodiment of the endless tape in the endless tape storage apparatus, the master tape initially wound on a master tape supply reel 40 is withdrawn from the reel and inserted into the tape receptacle chamber 34 via the inlet 12a. The leading end of the master tape is withdrawn from the outlet 12b. The condition in which the leading and of the master tape is just withdrawn from the outlet 12b is shown in FIG. 4. The leading end of the master tape 2 is maintained at this position. In this condition, the capstan 20 is rotated and the air nozzles 38a, 38b and 38c start discharging air. At the same time, the electromagnet 13 is driven at the predetermined frequency for causing vibration of the vibration plate 31. By this, the master tape 2 supplied from the master tape supply reel 40 is continuously entered into the inside of the tape receptacle chamber and accumulated therein in folded form. At this time, because the vibration plate 31 is driven to vibrate, the tape within the tape receptacle is transferred toward the stationary plate 32a, as shown in FIG. 5. When the tape transferred by the vibration of the vibration plate 31 reaches the stationary plate 32a, the externally exerted transferring force to feed the tape in the forward direction becomes zero. Therefore, the tape is simply pushed by the following tape section which stays on the vibration plate 31 and thus subjects transferring force. When the tape is transferred on the stationary plate 32a by the force exerted on the following tape section, the concentration of the tape at the transition section in the vicinity of the clearance G becomes higher than the remaining sections. Such a high concentration at this section decreases the tape transferring speed and causes resolving of the folded tape due to the resilience of the tape while it is moved toward the outlet 12b, as shown in FIG. 6. After setting the master tape in the tape receptacle chamber 34 in a form shown in FIG. 6, the leading end and the trailing end of the tape are connected to each other to form an endless loop.

Figure 7:
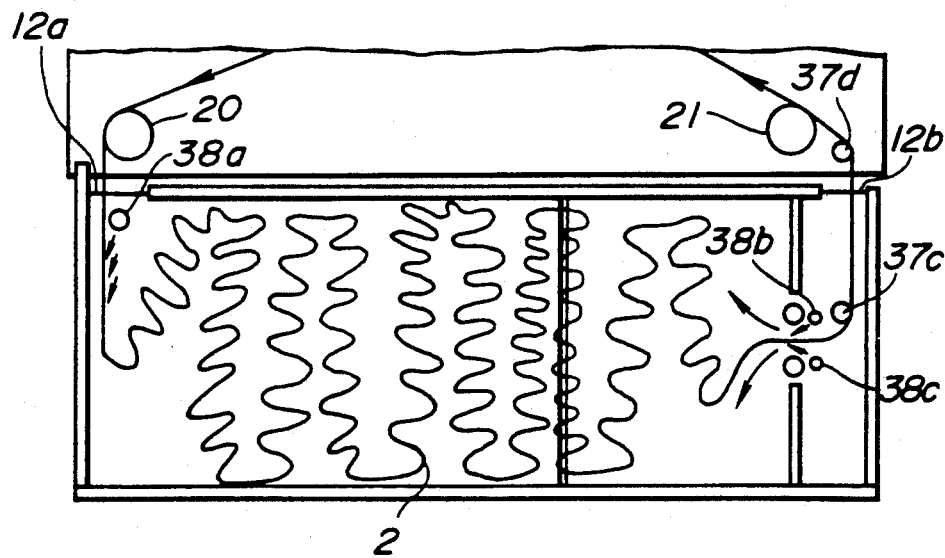
FIG. 7 is an illustration showing the first embodiment of the tape storage apparatus storing relatively short endless tape.

When the length of the tape is relatively short, the endless master tape 2 is stored in the tape receptacle chamber 34 in a form substantially as shown in FIG. 7.

The recorded tape duplicating operation is performed after setting the endless master tape in the described embodiment of the tape storage apparatus. During the tape duplicating operation, the master tape 2 is withdrawn from the outlet 12b to be driven through the information transferring section and enters into the tape receptacle chamber 34 via the inlet 12a. The slave tape 6 initially wound on the supply reel 7 has a length 16 to 20 times longer than the length of the master tape so that 16 to 20 copies of the recorded information can be produced in one cycle of the operation. As is well known, a tape duplicating operation is performed at substantially high speed so that 16 to 20 copies of the recorded tapes can be produced within 13 to 16 min. During this tape duplicating operation, since the master tape is formed as an endless loop, a continuous duplicating operation can be performed for the 16 to 20 copies.

During this tape duplicating operation set forth above, since the master tape supplied into the tape receptacle chamber 34 is successfully transferred toward the stationary plate 32a by vibration energy exerted on the vibration plate 31 by means of the electromagnet 13 and the leaf springs 15a and 15b, the tape is decelerated and accumulated at the transition section between the vibration plate 31 and the stationary plate 32a so as to be pushed toward the outlet 12b and cause resolving by its own resiliency for lowering the density the compared to that of the transition section. This enables smooth withdrawal of the tape through the outlet 12b. Furthermore, since the presence of the transition section successfully prevents the tape from being excessively folded or colliding with the side wall, a greater amount of tape can be stored in the apparatus. In addition, since the described embodiment does not affect the tape length, adjustment of the tape feed speed in the tape receptacle chamber 34 becomes unnecessary. Additionally, in comparison with the prior proposed apparatus disclosed in the British Patent First Publication No. 2198281, the mass weight of the vibration plate 31 can be reduced about two-thirds for reducing the required power for vibratingly driving the vibration plate 31. Therefore, power consumption for driving the apparatus can be reduced.

Figure 8:
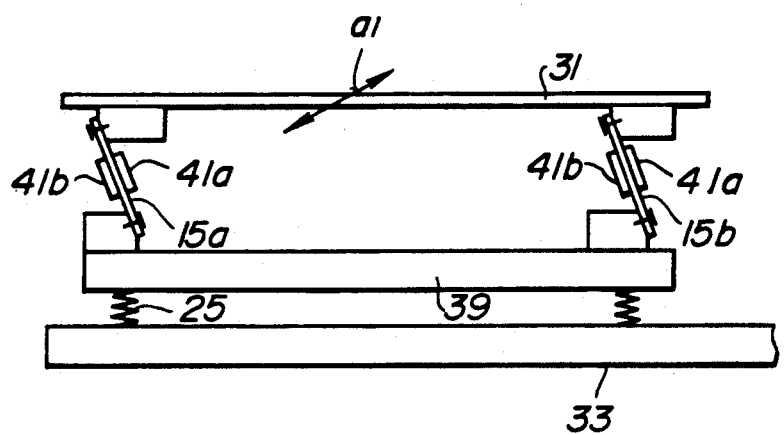
FIG. 8 is a section showing a modification of the first embodiment of the endless tape storage apparatus according to the invention.

FIG. 8 shows a modification of the previously described embodiment of the endless tape storage apparatus according to the invention. In this embodiment, the electromagnet as the vibration power source can be replaced with piezoelectric elements 41a and 41b. In such case 180° phase shifted drive signals are applied to the piezoelectric elements 41a and 41b to cause oscillation in a direction $a_1$.

It is also possible to vertically vibrate the vibration plate and provide a slightly downward slope for the vibration plate toward the stationary plate to transfer the tape.

Figure 9:
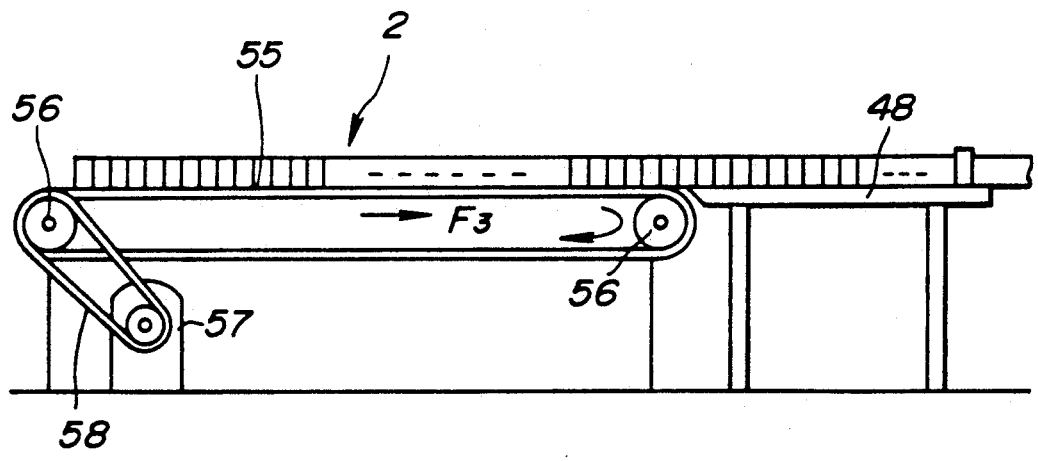
FIG. 9 is a front elevation of another modification of the first embodiment of the endless tape storage apparatus according to the invention.

FIG. 9 shows another modification of the first embodiment of the tape storage apparatus according to the invention. In this embodiment, the vibration plate is replaced with a belt conveyor 55 forming the bottom of the transferring section. In this case, the belt conveyor 55 is provided between a pair of pulleys 56 and is driven by means of a driving motor 57 via a driving belt 58. The driving speed of the motor 57 is adjusted to obtain the desired tape transferring speed. By the presence of the stationary plate 48, a similar effect to that obtained in the former embodiment can be obtained in this embodiment.

Figure 10:
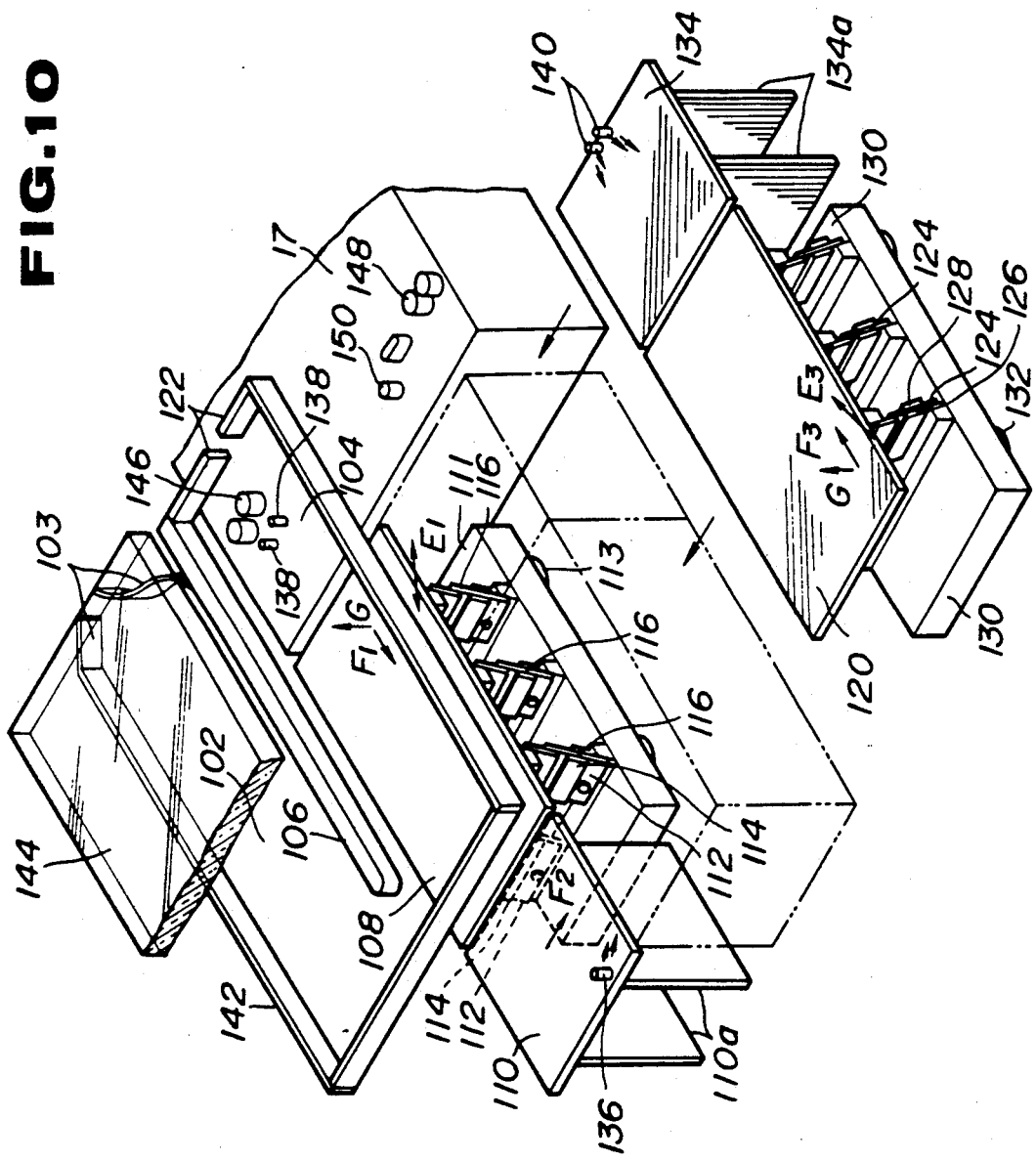
FIG. 10 is an exploded perspective view of the second embodiment of an endless tape storage apparatus according to the invention.
Figure 11:
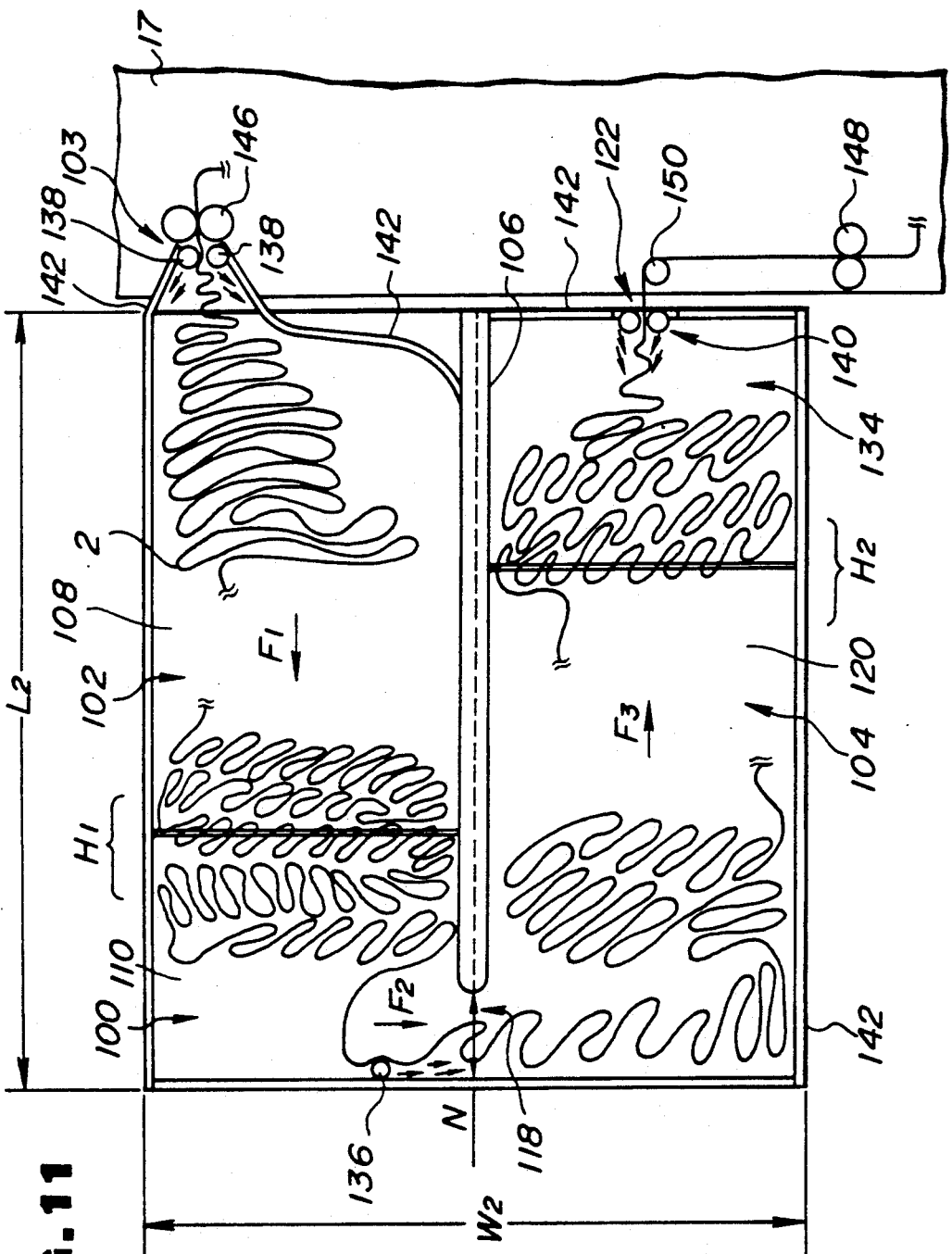
FIG. 11 is a plan view of the second embodiment of the endless tape storage apparatus.

FIGS. 10 and 11 show another embodiment of the endless tape storage apparatus according to the present invention. In this embodiment, the tape receptacle chamber 100 is formed on the horizontal plane. In the tape receptacle chamber 100, the endless loop form master tape is transferred in directions $F_1$, $F_2$ and $F_3$ as shown in FIG. 11. As seen from FIGS. 10 and 11, the tape receptacle chamber 100 is separated into inlet side chamber 102 and an outlet side chamber 104 by a partition 106. In the inlet side chamber 102, a vibration plate 108 and stationary plate 110 are provided with vertically extending support members 110a. The vibration plate 102 is provided in the vicinity of the inlet 103 for transferring the endless tape fed into the inlet side chamber 102 toward the stationary plate 110. The vibration plate 108 is designed to be driven by a combination of leaf springs 112 and piezoelectric elements 114 and 116 in substantially the same manner as discussed with respect to the first embodiment. The leaf springs 112 are supported on a floating base 111 which is supported by means of resiliently or elastically deformable supporting blocks 113.

The inlet side chamber 102 communicates with the outlet side chamber 104 via a clearance 118. A vibration plate 120 is provided in the outlet side chamber 104 and in the vicinity of the clearance 118 so that it may feed the tape transferred from the inlet side chamber toward the outlet 122. Similar to the vibration plate 108, the vibration plate 120 is associated with leaf spring 124 and piezoelectric elements 126 and 128 and supported on a floating base 130 which is supported by means of resiliently or elastically deformable supporting blocks 132. In the vicinity of the outlet, a stationary plate 134 is provided.

In order to feed the endless tape transferred to the stationary plate 110 through the inlet side chamber 102 toward the vibration plate 120, an air nozzle 136 is provided in the inlet side chamber and in the vicinity of the clearance 118 for discharging air toward the outlet side chamber 104 so that the tape section oriented in the vicinity of the clearance 118 can be forced into the outlet side chamber 104.

In the shown embodiment, the reference numeral 138 denote air nozzles provided in the vicinity of the inlet 103; the reference numeral 140 denote air nozzles in the vicinity of the outlet 122. The reference numeral 142 denotes a side wall defining the tape receptable chamber, which side wall is formed integrally with the partition 106. The reference numeral 144 denotes a transparent cover covering the upper side of the tape receptacle chamber. The reference numeral 146 denotes a capstan at the inlet side and 148 denotes a capstan at the outlet side. The reference numeral 150 denotes a guide roller provided in the vicinity of the outlet 122.

With the construction set forth above, the endless loop form tape can be effectively transferred through the inlet side chamber 102 and the outlet side chamber for establishing as smooth a tape feed as that achieved by the first embodiment. In addition, since the shown embodiment requires shorter distance between the inlet and outlet, the lateral width can be made smaller in comparison with the former embodiment. Therefore, when the second embodiment of the endless tape storage apparatus is used for the tape duplicating system, the lateral width of the duplicating machine can be reduced.

Figure 12:
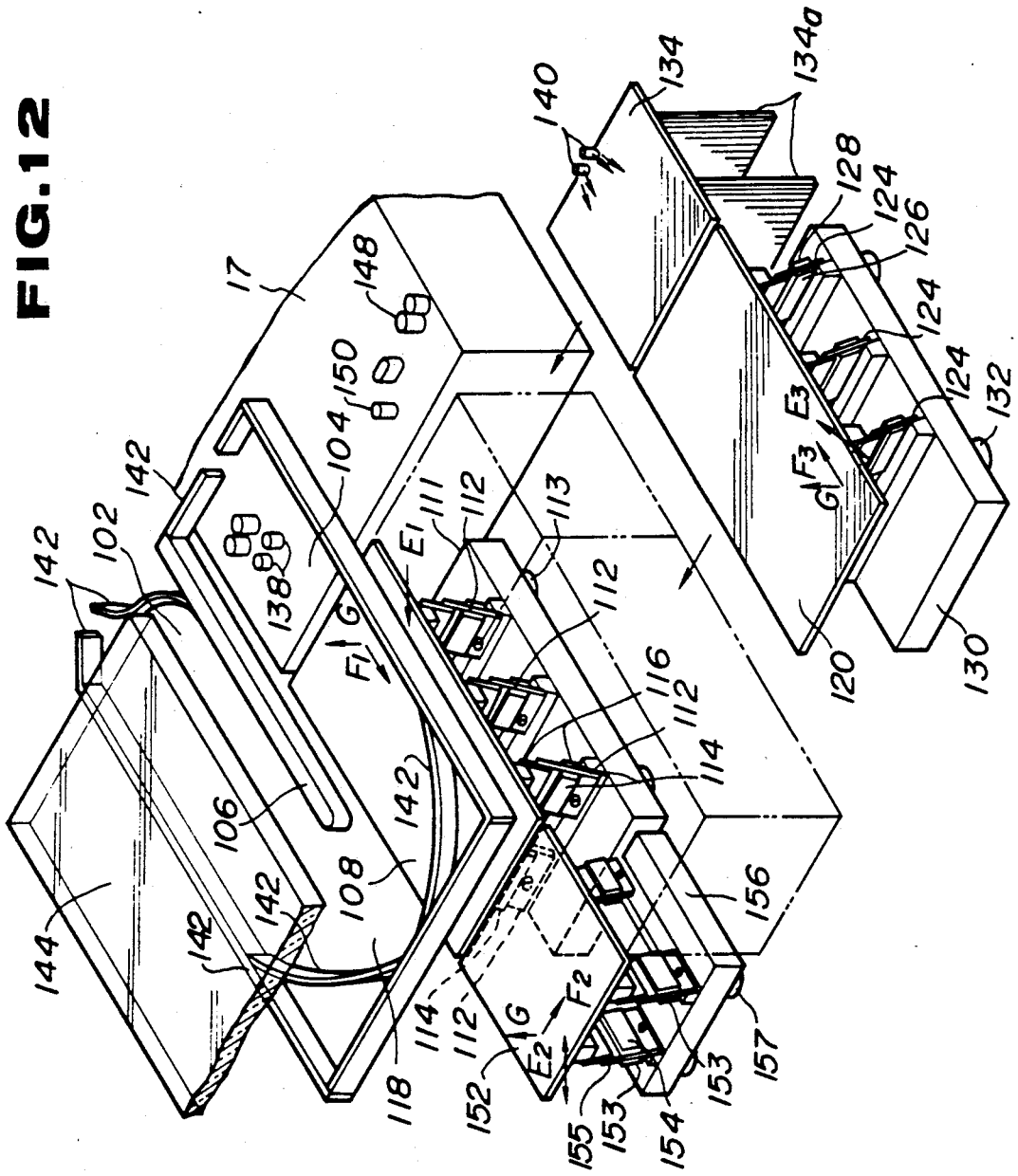
FIG. 12 is an exploded perspective view of the third embodiment of an endless tape storage apparatus according to the present invention.
Figure 13:
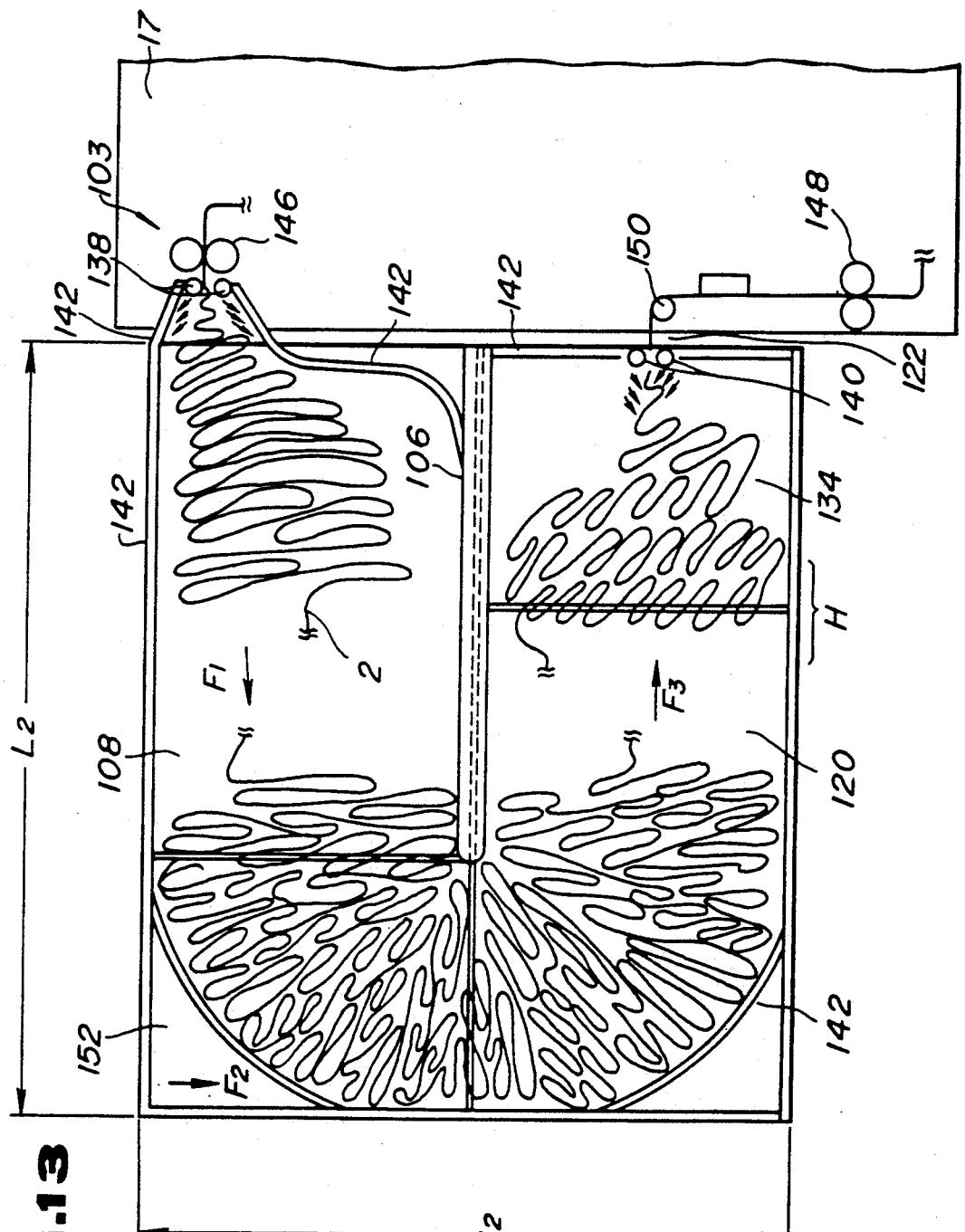
FIG. 13 is a plan view of the third embodiment of the endless tape, storage apparatus of FIG. 12.

FIGS. 12 and 13 show a modification of the second embodiment of the endless tape storage apparatus according to the invention. In the shown modification, the elements common to the embodiment of FIGS. 10 and 11 will be represented by the same reference numerals and detailed discussion of these elements will be omitted for simplification of the disclosure and to avoid confusion. In the shown embodiment, the stationary plate 110 of the inlet side chamber 102 is replaced with a vibration plate 152 which is driven to vibrate the tape with a transferring force in direction $F_2$. This vibration plate 152 serves for transferring the tape transferred through the inlet side chamber 102 to the outlet side chamber 104. The vibration plate 152 is vibratingly driven by a bimorph element 153 which comprises a pair of piezoelectric elements 154 and 155 in order to provide a transferring force in the direction $F_2$. The bimorph element 153 is supported on a floating base 156 which is elastically or resiliently supported by supports 157.

With this modification, transfer of the tape from the inlet side chamber 102 to the outlet side chamber 104 can be assured.

Figure 14:
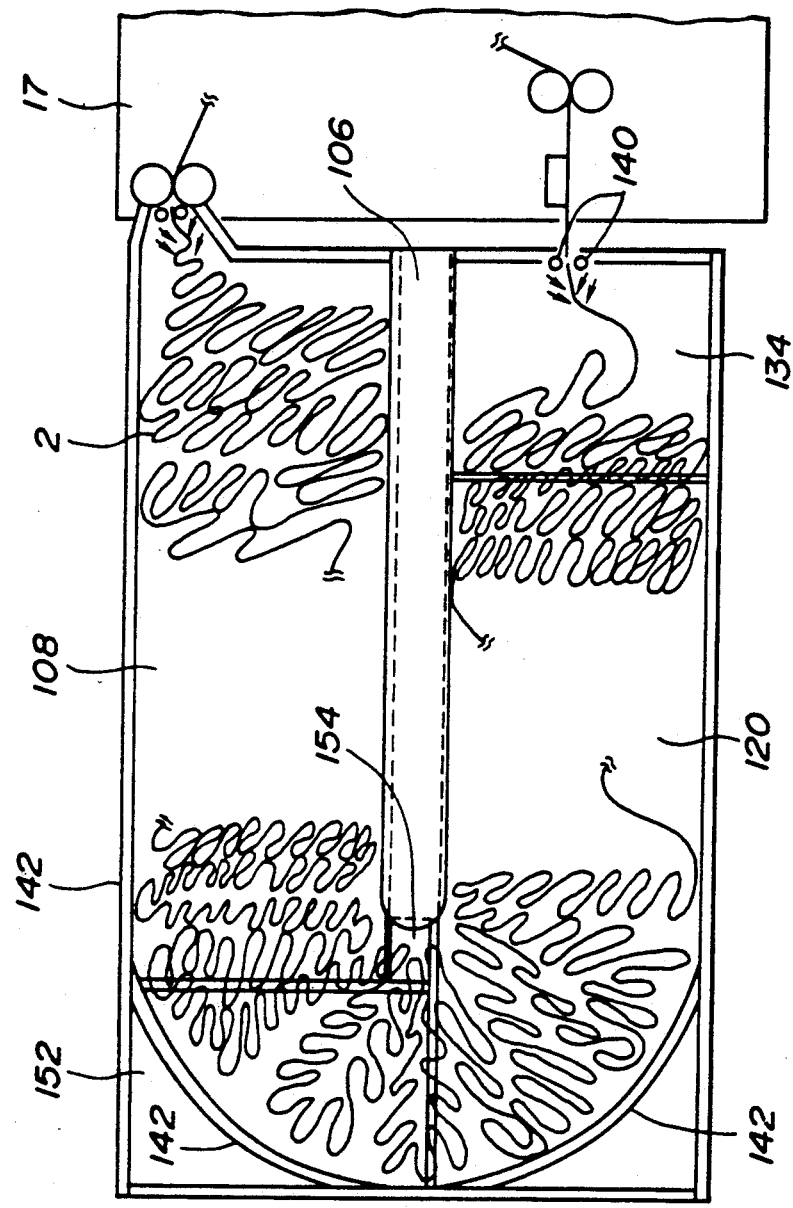
FIG. 14 is plan view of a modification of the third embodiment of the endless tape storage apparatus of the present invention.
Figure 15:
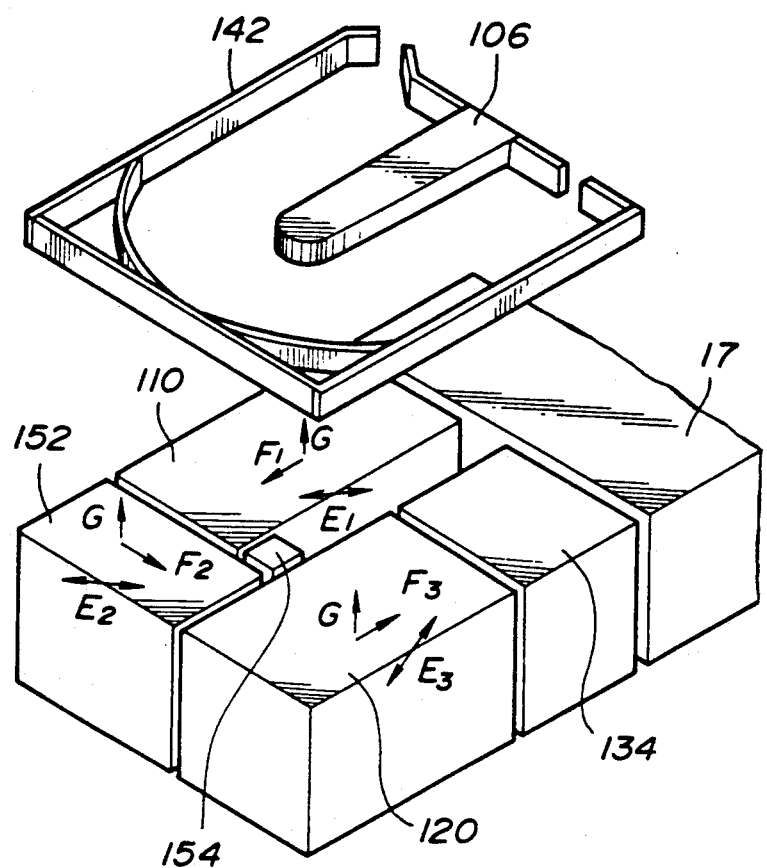
FIG. 15 is a fragmentary and exploded perspective view of the endless tape storage apparatus of FIG. 14.

FIGS. 14 and 15 show a further modification of the embodiments of FIGS. 12 and 14. In this modification, a small stationary plate 154 is provided in the vicinity of the tip end of the partition 106. This stationary plate 154 serves for decelerating the transfer speed at the portion inside the curve and thus provides a transfer speed difference between the inside and outside of the curve for establishing uniform and smooth transfer from the inlet side chamber to the outlet side chamber. The effect of the stationary plate 154 may be clear from the illustration of FIGS. 16(A) and 16(B).

Figure 16:
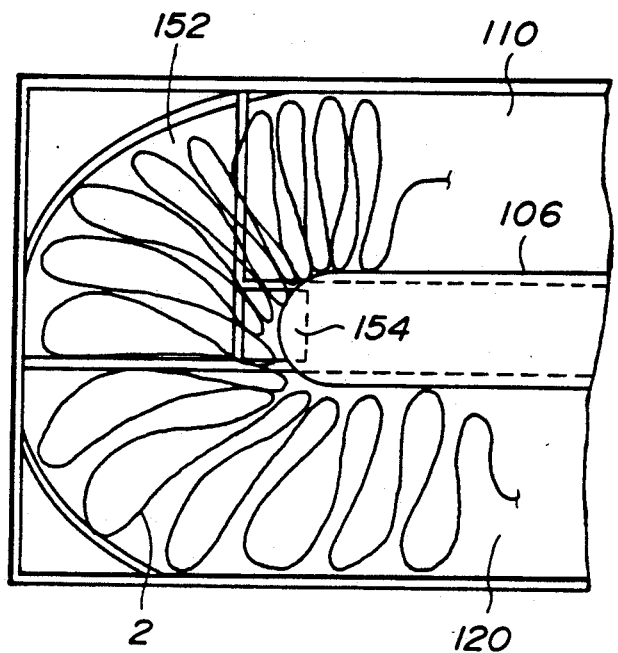
FIGS. 16(A) and 16(B) are illustration showing tape action during the tape transferring operation in the embodiments of FIGS. 13 and 14.
Figure 16:
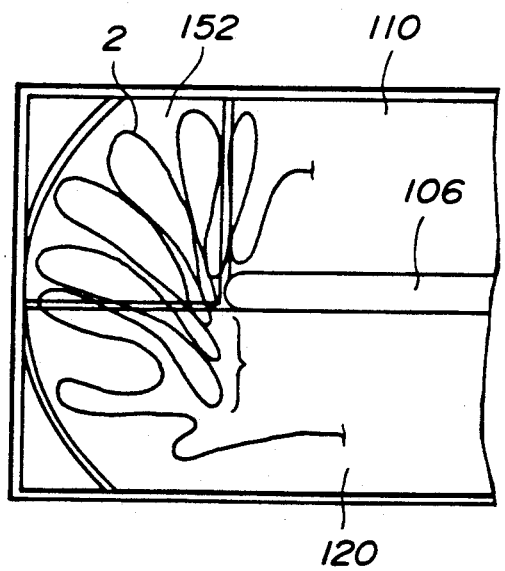

As seen from FIG. 16(B), when the stationary plate 154 is not provided, the inside section of the tape enters into the outlet side chamber 104 to cause reversal of the tape transferring order. On the other hand, as seen from FIG. 16(A), the stationary plate 154 decelerates the inside section to cause the inside and outside sections of the tape to enter into the outlet side chamber 104 at approximately the same time.

Figure 17:
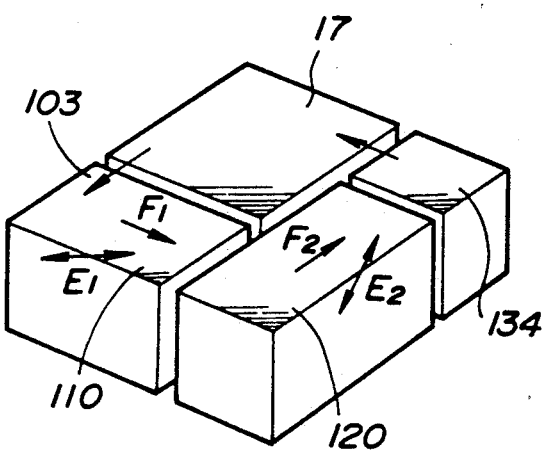
FIG. 17 shows the tape transferring direction in another modification of the third embodiment of the endless tape storage apparatus of the invention.

FIG. 17 shows a modified layout of the vibration plates 108, 120 and 154 and the mechanical plate 17 of the tape duplicating system. By utilizing three vibration plates, the shown layout becomes possible for saving space required for installation of the system.

Figure 18:
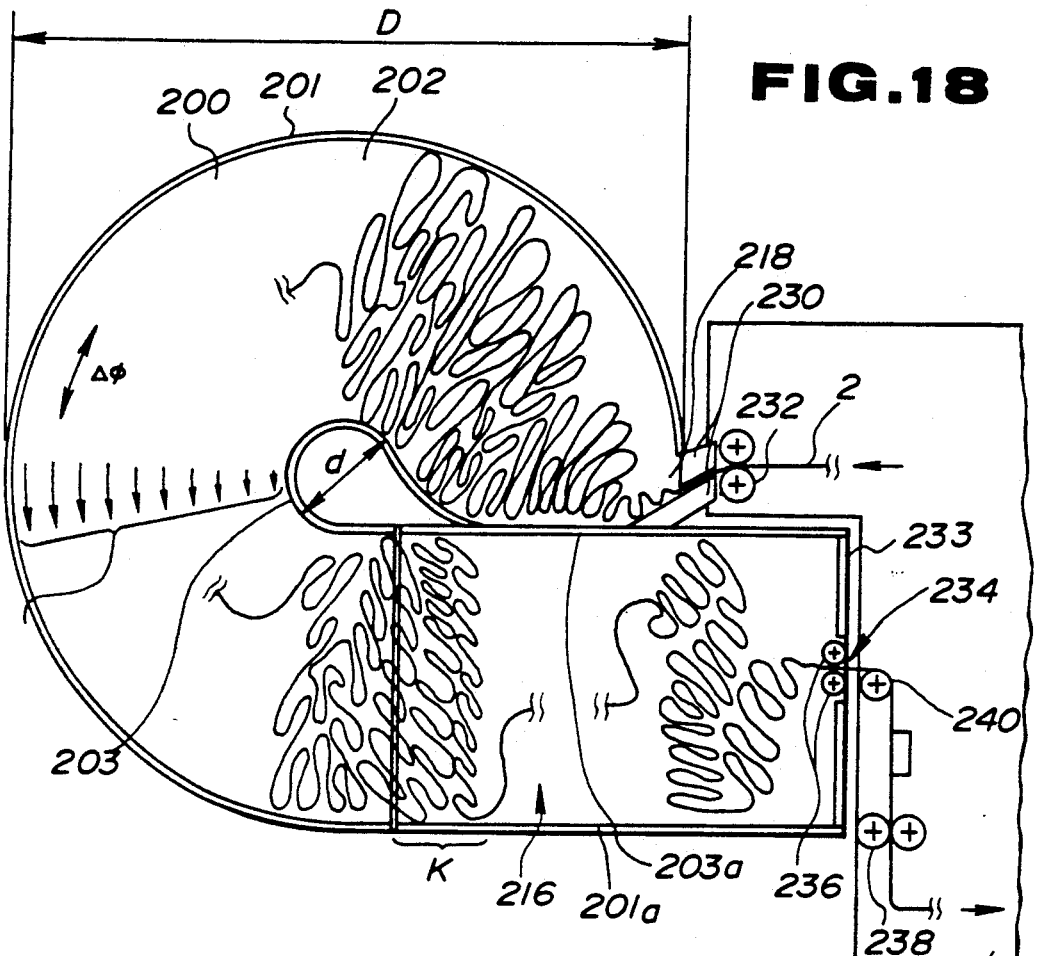
FIG. 18 is a plan view of the fourth embodiment of the endless tape storage apparatus according to the invention.
Figure 19:
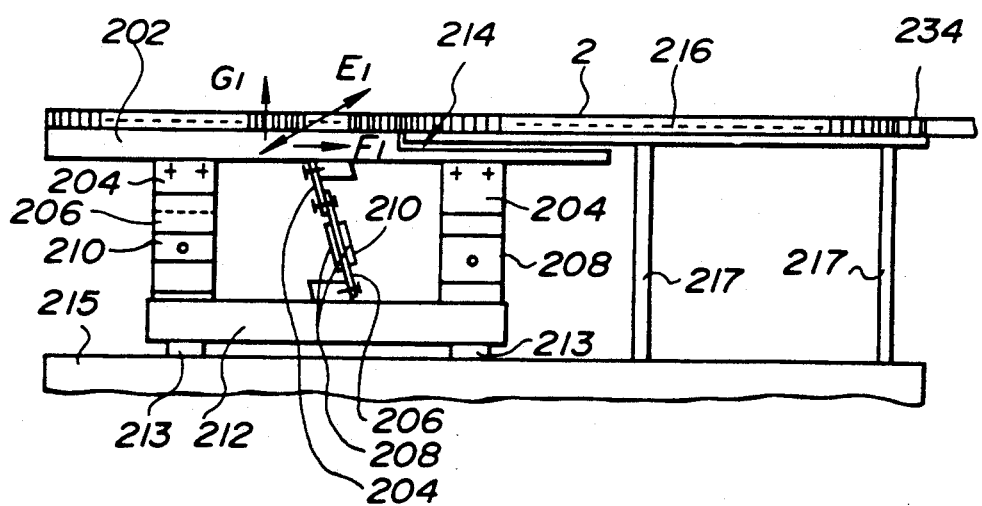
FIG. 19 is a front elevation of the fourth embodiment of the endless tape storage apparatus of FIG. 18.
Figure 20:
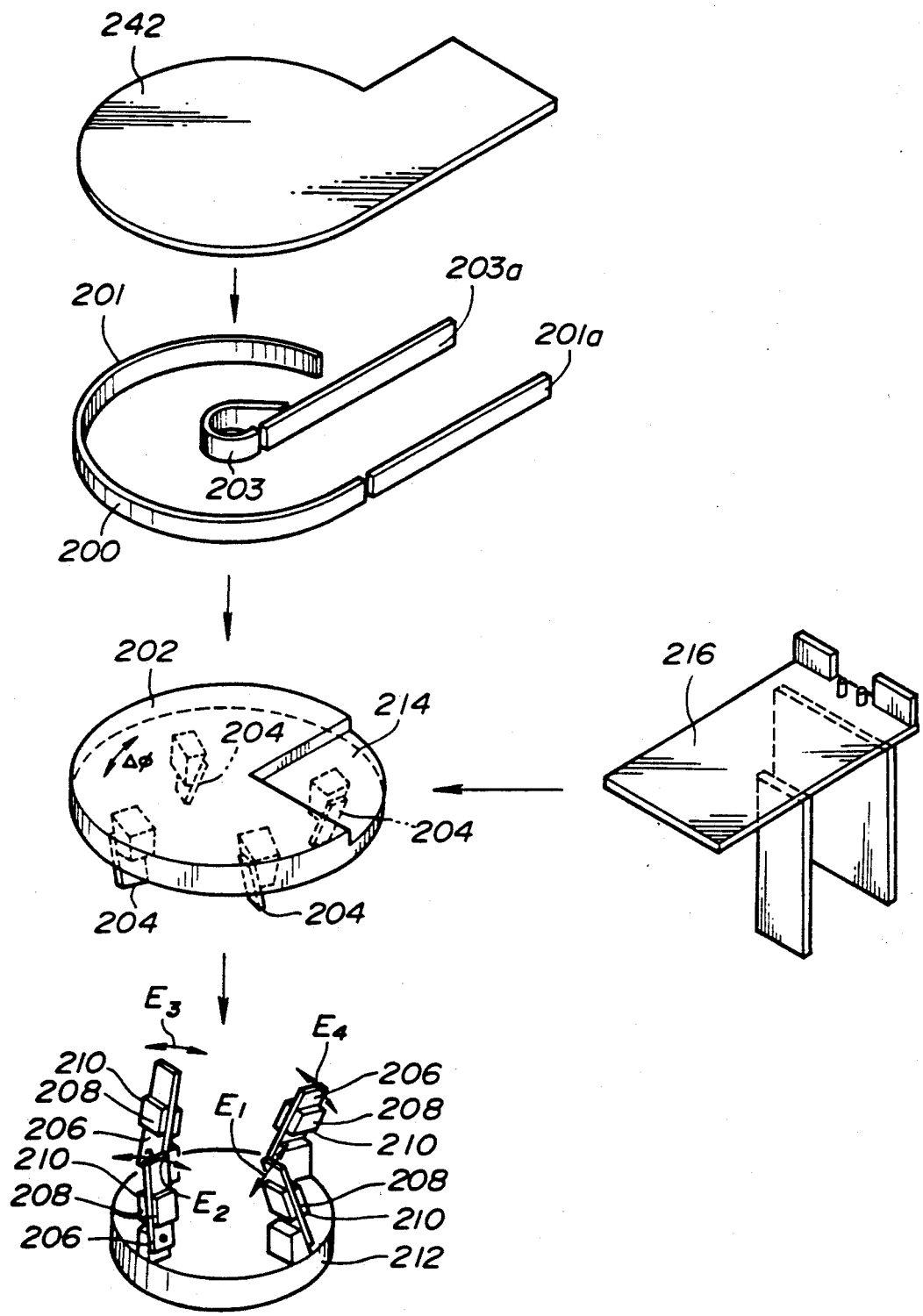
FIG. 20 is an exploded perspective illustration of the fourth embodiment of the endless tape storage apparatus of FIG. 18.

FIGS. 18 and 19 shows the third embodiment of an elongated tape storage apparatus according to the invention. In this embodiment, a tape receptacle chamber 200 is formed on a horizontal plate and defined by an essentially circular outer side wall 201 and an inner side wall 203. The side walls 201 and 203 includes straight wall sections 201a and 203a for defining a section for decelerating the tape transferring speed and accumulating the tape. The tape receptacle chamber 200 has a circular disc shaped vibration plate 202. Similar to the former embodiments, the tape receptacle chamber 200 defines an inlet 230. A pinch roller 232 is provided in the vicinity of the inlet 230 for feeding the tape into the tape receptacle chamber. The tape receptacle chamber 200 also has an end wall 233 which defines an outlet 234 with air nozzles 236. In the vicinity of the outlet 234, a pinch roller 238 is provided for withdrawing the tape from the tape receptacle chamber 200 via a guide roller 240. The tape receptacle chamber 200 is closed by a transparent cover 242 such as shown in FIG. 20.

The disc shaped vibration plate 202 is provided with yokes 204 projecting downwardly from the lower surface thereof. Yokes 204 are radially arranged in symmetrical position for providing a dynamic balance of the plate 202. Each yoke 204 is associated with a leaf spring 206 with piezoelectric elements 208 and 210. The assembly of the leaf spring 206 and the piezoelectric elements 208 and 210 are arranged on a floating base 212 supported on an elastic or resilient support 213 on a stationary base 215 and provide a vibrating direction which substantially coincides with a direction tangent to the circle of the circular disc shaped vibration plate 202.

In the shown embodiment, four yokes 204 and four assemblies of the leaf springs 206 and the piezoelectric elements 208 and 210 are provided in circumferential alignment and with circumferentially equal intervals.

The vibration plate 202 has a stepped down section 212 at an orientation opposing the outlet 214. A stationary plate 216 is placed in the stepped down section 212 and supported by support members 217. The stationary plate 216 has a thickness substantially in conformance with the stepped down section to maintaining sufficient clearance for avoiding collision between the vibration plate 202 and the stationary plate 216.

With the shown embodiment, the composite vibration energy exerted on the vibration plate 202 serves for transferring the tape in the tape receptacle chamber in a circumferential direction. Therefore, the endless tape entering into the tape receptacle chamber via an inlet 218 is circumferentially transferred through the essentially annular tape receptacle chamber 202. Similar to the foregoing embodiments, the stationary plate serves for decelerating the tape transferring speed and thus permit resolving of the folded tape in advance of it being withdrawn from the outlet 234.

FIG. 21 shows a modification of the driving mechanism for circumferentially driving the tape along the annular tape receptacle chamber 202. In this modification, spring seats 222 are mounted on the lower surface of the vibration plate 202 in circumferential alignment and with circumferentially equal intervals. The spring seat receives the leaf springs 206. A yoke 224 is extended from the lower surface of the vibration plate 202. The yoke opposes an electromagnet 226 which is provided on the floating base 212 so as to drive the yoke in a tangential direction with respect to the circle of the vibration plate. Therefore, with the shown arrangement, the circumferential tape transferring energy can be obtained similar to the foregoing embodiment of FIGS. 18 to 20.

Figure 22:
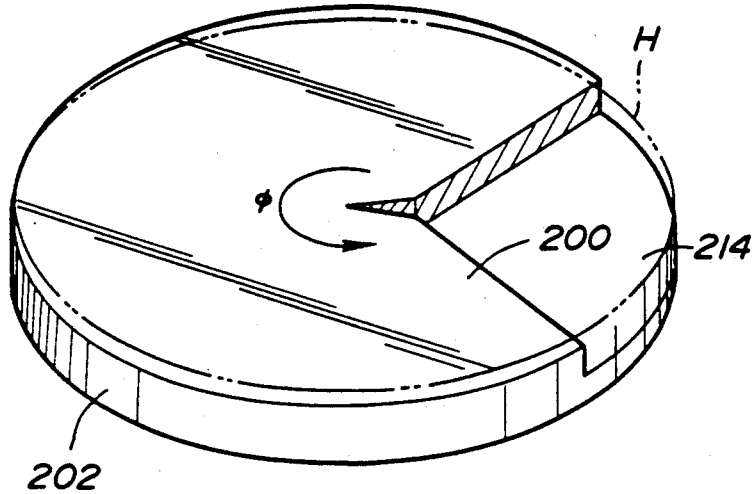
FIG. 22 is a perspective view of a disc-shaped base plate of the endless tape storage apparatus of FIG. 18.
Figure 23:
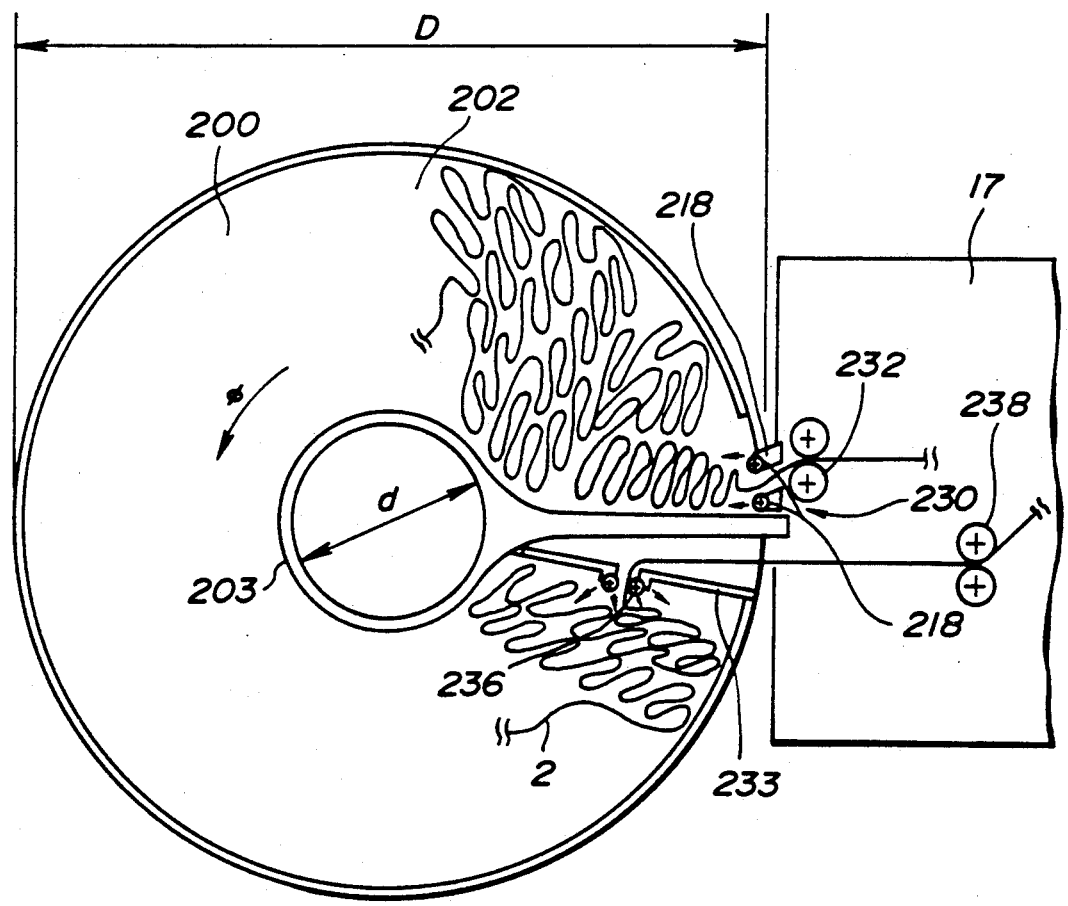
FIG. 23 is a plan view of another modification of the fourth embodiment of the endless tape storage apparatus according to the invention.
Figure 25:
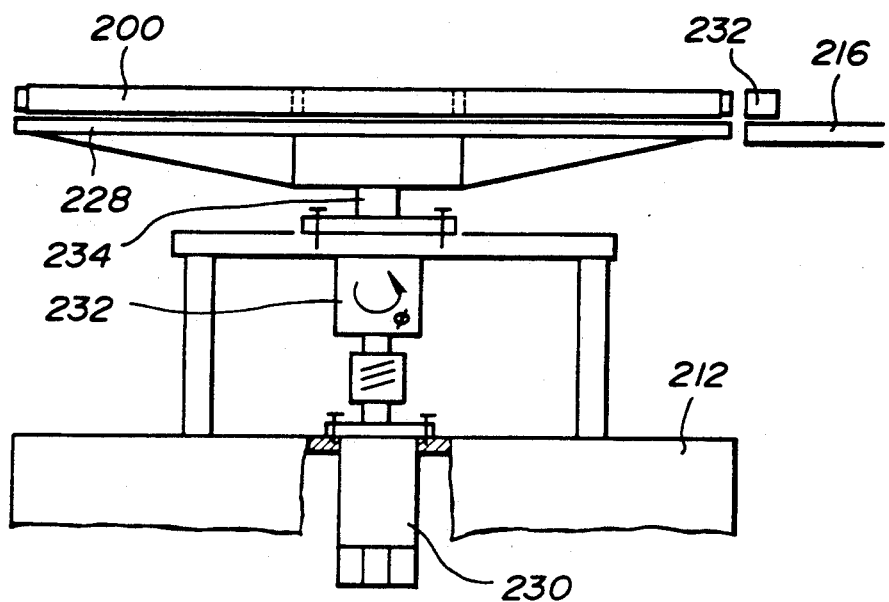
FIG. 25 is a front elevation of a modification of the endless tape storage apparatus of FIG. 23.

FIG. 22 shows a modified configuration of the disc shaped vibration plate 202 of the third embodiment of the elongated tape storage apparatus according to the invention. In this embodiment, the upper surface of the vibration plate 202 is slightly inclined toward the stepped down section in a direction $\phi$ for providing further smooth tape transfer function.

In case of the modification of FIG. 22, the vibration plate driving mechanism comprises the leaf springs 206 and the electromagnet 226 and the yoke 224.

Figure 24:
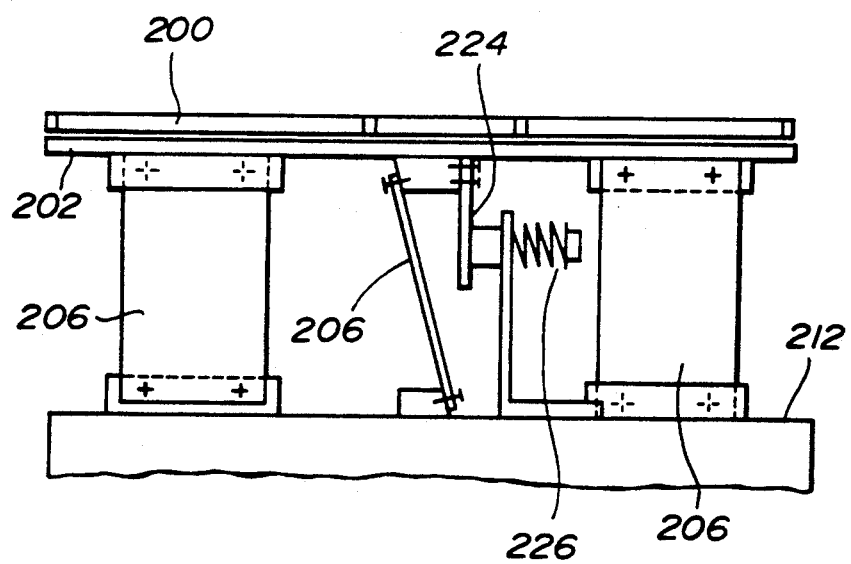
FIG. 24 is a front elevation of the endless tape storage apparatus of FIG. 23.

FIG. 24 shows a modification of the third embodiment of the elongated tape storage apparatus according to the invention. In this modification, the tape receptacle chamber is provided without providing the stationary plate. The shown construction will provide smooth circumferential transfer of the tape by exerting vibration energy in tangential direction. In the modification, the vibration plate is replaced with a rotary plate 228 which is rotatingly driven by means of an electric motor 230 via a reduction gear unit 232 and a drive shaft 234. The rotation speed of the rotary plate 228 may be adjusted to the desired tape transfer speed. Even with the shown modification, equivalent tape transferring effect can be obtained.

It should be appreciated that though the third embodiment employs a circular disc shaped vibration plate, the configuration of the vibration plate is not essential to the present invention and can be of any appropriate configuration.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. An endless tape storage apparatus comprising:
    a casing defining a chamber for storing said endless tape on a horizontal plane, said casing defining an inlet through which the tape is introduced and an outlet through which the tape is withdrawn;

a movable section associated with said inlet, for storing the tape in folded form and transferring the tape mounted thereon toward said outlet; and a stationary section provided downstream of said movable section for decelerating the transfer speed of said tape and adjusting accumulation of the transferred tape in the vicinity of the outlet.

2. An endless tape storage apparatus as set forth in claim 1, wherein said movable section comprises a movable plate and an external driving unit for driving said movable plate for exerting transferring force to said tape mounted thereon.

3. An endless tape storage apparatus as set forth in claim 2, wherein said driving unit comprises a spring member for resiliently supporting said movable plate, a yoke and electromagnet combination, said electromagnet being periodically energized and deenergized for generating vibration energy including a component in the tape transferring direction.

4. An endless tape storage apparatus as set forth in claim 2, wherein said driving unit comprises a spring member for resiliently supporting said movable plate and piezoelectric elements which are periodically energized and deenergized for generating vibration energy including a component in the tape transferring direction.

5. An endless tape storage apparatus as set forth in claim 1, wherein said chamber is separated into a first tape transfer section associated with said inlet and a second tape transfer section associated with said outlet, a first movable 17, wherein said chamber is separated into a first tape storage section associated with said inlet and a second tape storage section associated with said outlet, a first movable section and a first stationary section being provided in said first tape storage section, and a second movable section and second stationary section being provided in said second tape storage section, said first and second movable sections transferring the master tape thereon in different directions to each other.

6. An endless tape storage apparatus as set forth in claim 5, wherein said first stationary section is provided with means for varying the transferring direction.

7. An endless tape storage apparatus as set forth in claim 5 or 6, wherein said first tape storage section transfers a tape in a direction substantially parallel to a tape feed direction at the inlet and said second tape storage transfers the tape in a direction opposite to the tape transfer direction in said first tape storage section.

8. An endless tape storage apparatus as set forth in claim 1, wherein said chamber is separated into a first tape storage section associated with said inlet and a second tape storage section associated with said outlet, a first movable section being provided in said first tape storage section, and a second movable section and second stationary section being provided in said second tape storage section, and a third movable section provided for transferring the tape transferred through said first tape storage section to said second tape storage section, said first, second and third movable sections transferring the tape thereon in different directions to each other.

9. An endless tape storage apparatus as set forth in claim 8, which further comprises a stationary plate oriented at a position near the inside of a turning section where the tape transferring direction is changed between said first and second tape transfer sections.

10. A tape duplicator system for duplicating information recorded on an endless form master tape to a continuously fed blank slave tape, comprising:

first means for defining a first path through which said master tape is circulated;

second means for defining a second path through which said slave tape is fed, said second path including an information transfer section at which said slave tape mates with said master tape;

third means, active at said information transferring section, for duplicating information recording on said master tape to said slave tape; and an endless tape storage apparatus comprising:

a casing defining a chamber for storing said endless master tape, said casing defining an inlet through which the master tape is introduced and an outlet through which the master tape is withdrawn;

a movable section associated with said inlet, storing the master tape in folded form and transferring the master tape mounted thereon toward said outlet; and a stationary section provided downstream of said movable section and decelerating transferring speed of said master tape and accumulating the transferred master tape;

wherein said chamber is defined on a horizontal plane for storing and transferring said master tape on said horizontal plane.

11. A tape duplicator system as set forth in claim 10, wherein said movable section comprises a movable plate and an external driving unit for driving said movable plate for exerting a transferring force to said master tape mounted thereon.

12. A tape duplicator system as set forth in claim 11, wherein said driving unit comprises a spring member for resiliently supporting said movable plate, a yoke and electromagnet combination, said electromagnet being periodically energized and deenergized for generating vibration energy including a component in the tape transferring direction.

13. A tape duplicator system as set forth in claim 11, wherein said driving unit comprises a spring member for resiliently supporting said movable plate and piezoelectric elements which are periodically energized and deenergized for generating vibration energy including a component in the tape transferring section.

14. A tape duplicator system as set forth in claim 10, wherein said chamber is separated into a first tape storage section associated with said inlet and a second tape storage section associated with said outlet, a first movable section and a first stationary section being provided in said first tape storage section, and a second movable section and second stationary section being provided in said second tape storage section, said first and second movable sections transferring the master tape thereon in different directions with respect to each other.

15. A tape duplicator system as set forth in claim 14, wherein said first stationary section is provided with means for varying the transferring direction.

16. A tape duplicator system as set forth in claim 10, wherein said chamber is separated into a first tape storage section associated with said inlet and a second tape storage section associated with said outlet, a first movable section being provided in said first tape storage section, and a second movable section and second stationary section being provided in said second tape storage section, and a third movable section provided for transferring the master tape transferred through said first tape storage section to said second tape storage section, said first, second and third movable sections transferring the master tape thereon in different directions with respect to each other.

17. A tape duplicator system as set forth in claim 16, further comprising a stationary plate oriented at a position near the inside of a turning section where the tape transferring direction is changed between said first and second tape transfer sections.

18. A tape duplicator system as set forth in claim 14 or 16, wherein said first tape storage section transfers a master tape in a direction substantially in parallel to a master tape feed direction at the inlet and said second tape storage section transfers the master tape in a direction opposite to the tape transfer direction in said first tape storage section.

19. An endless tape storage apparatus comprising:
a casing defining an essentially circular chamber, an inlet through which the tape is introduced into said circular chamber, and an outlet through which the tape within the circular chamber is withdrawn, said tape being stored in said circular chamber in folded fashion and fed from said inlet to said outlet, a movable plate forming a bottom of said chamber, a stationary section provided downstream of said movable plate for storing said endless tape on a horizontal plane and decelerating the feed rate of said tape and adjusting accumulation of the tape in the vicinity of the outlet, and a driving unit operably connected with said movable plate for exerting energy in a circumferential direction for feeding tape in said circumferential direction from said inlet to said outlet.

20. An endless tape storage apparatus as set forth in claim 19, wherein said drive unit drives said movable plate to rotate at a rotation speed corresponding to a desired tape transferring speed.

21. An endless tape storage apparatus as set forth in claim 19, wherein said driving unit comprises a spring member for resiliently supporting said movable plate, a yoke and electromagnet combination, said electromagnet being periodically energized and deenergized for generating vibration energy including a component in the tape transferring direction.

22. An endless tape storage apparatus as set forth in claim 19, wherein said driving unit comprises a spring member for resiliently supporting said movable plate and piezoelectric elements which are periodically energized and deenergized for generating vibration energy including a component in the tape transferring direction.

* * * * *